US007544292B2

(12) United States Patent
Cormier et al.

(10) Patent No.: US 7,544,292 B2
(45) Date of Patent: Jun. 9, 2009

(54) APPARATUS FOR DENITRIFYING WASTEWATER

(75) Inventors: Murphy J. Cormier, Lake Charles, LA (US); Ronald J. Suchecki, Jr., China Spring, TX (US); Robert K. Pertuit, Sulphur, LA (US); Donald L. Brown, Flint, TX (US); Troy L. Cormier, Lake Charles, LA (US)

(73) Assignee: Hoot Aerobic Systems, Inc., Lake Charles, LA (US)

( * ) Notice: Subject to any disclaimer, the term of this patent is extended or adjusted under 35 U.S.C. 154(b) by 0 days.

(21) Appl. No.: 11/721,995

(22) PCT Filed: May 4, 2007

(86) PCT No.: PCT/US2007/068288

§ 371 (c)(1), (2), (4) Date: Jun. 18, 2007

(87) PCT Pub. No.: WO2007/131197

PCT Pub. Date: Nov. 15, 2007

(65) Prior Publication Data

US 2008/0035538 A1     Feb. 14, 2008

(51) Int. Cl.
*B01D 15/00* (2006.01)
(52) U.S. Cl. .............. 210/198.1; 210/205; 210/209; 210/610; 210/611
(58) Field of Classification Search .......... 210/743, 210/745, 610–611, 620, 220, 198.1, 746, 210/205, 209
See application file for complete search history.

(56) References Cited

U.S. PATENT DOCUMENTS

| 4,043,936 | A |   | 8/1977  | Francis et al. |
|-----------|---|---|---------|----------------|
| 4,444,886 | A |   | 4/1984  | Esders et al. |
| 5,342,522 | A |   | 8/1994  | Marsman et al. |
| 5,556,536 | A | * | 9/1996  | Turk ............... 210/150 |
| 6,013,512 | A |   | 1/2000  | Turschmid et al. |
| 6,344,143 | B1|   | 2/2002  | Ahn et al. |
| 6,346,198 | B1| * | 2/2002  | Watson et al. ........ 210/739 |
| 6,426,004 | B1|   | 7/2002  | Hiatt et al. |
| 6,428,691 | B1| * | 8/2002  | Wofford ............. 210/151 |
| 6,652,743 | B2|   | 11/2003 | Wallace et al. |
| 6,689,274 | B1|   | 2/2004  | Northrop et al. |
| 6,767,464 | B2|   | 7/2004  | Boyd et al. |
| 6,806,078 | B2| * | 10/2004 | Newman ............ 435/262.5 |
| 6,896,804 | B2|   | 5/2005  | Haerther et al. |
| 6,949,196 | B2| * | 9/2005  | Schmitz et al. ........ 210/739 |
| 7,153,429 | B1| * | 12/2006 | Pedros ............... 210/610 |
| 2002/0170857 | A1 | * | 11/2002 | McGrath et al. ....... 210/610 |
| 2003/0211594 | A1 |   | 11/2003 | Rosebrook |

(Continued)

OTHER PUBLICATIONS

International Searching Authority, International Search Report, Dec. 27, 2007.

(Continued)

*Primary Examiner*—Chester T Barry
(74) *Attorney, Agent, or Firm*—Emerging Strategies. LLP

(57) ABSTRACT

Disclosed is a method of denitrifying a solution including introducing into the solution an amount of a carbon source within a duration and at a frequency so that indigenous heterotrophic bacteria deplete dissolved oxygen in the solution and obtain oxygen from nitrate in the solution. Related apparatuses and compounds also are disclosed.

12 Claims, 3 Drawing Sheets

U.S. PATENT DOCUMENTS

2004/0050764 A1    3/2004   Perriello
2004/0256315 A1*   12/2004  Boyd et al. .................. 210/610
2005/0145563 A1    7/2005   Boyd et al.
2006/0186041 A1*   8/2006   Dempsey .................... 210/617
2008/0176783 A1*   7/2008   DiCosimo et al. ........... 510/374

OTHER PUBLICATIONS web page "http://webbook.nist.gov/chemistry/cas-ser.html", Jun. 2005.

* cited by examiner

500 

| 505 | Measuring a Parameter of Wastewater and Defining a Measurement |

| 510 | Comparing the Measurement with a Predetermined Value |

| 515 | Introducing into the Wastewater an Amount of a Carbon Source, Wherein One or More of a Frequency of Said Introducing, a Duration of Said Introducing and the Amount Is Determined According to a Relationship Between the Measurement and the Predetermined Value |

Fig. 4

APPARATUS FOR DENITRIFYING WASTEWATER

REFERENCE TO EARLIER APPLICATIONS

This Application incorporates by reference and is a National Phase of International Patent Application No. PCT/US07/68288, filed May 4, 2007. This Application incorporates by reference U.S. patent application Ser. No. 60/796,893, filed May 3, 2006.

BACKGROUND OF THE INVENTION

Denitrification of solutions is useful for many reasons, such as limiting the total nitrogen discharged in wastewater to comply with local permits. Other reasons include: improving freshwater quality; controlling alkalinity and oxygen recovery, producing stabilized effluent, and reducing issues stemming from sludge accumulation in the clarifier.

Removing nitrogen from wastewater requires understanding the different forms of nitrogen and some commonly referred to terms:

Total Nitrogen (TN) is the sum of all nitrogen forms or:

Total Nitrogen=TKN+$NO_2$—+$NO_3$— where:

TKN stands for Total Kjeldahl Nitrogen, which is the sum of: $NH_3$+Organic Nitrogen;

NH3 stands for Ammonia Nitrogen or Ammonium ion ($NH_4$—);

Organic Nitrogen is derived from amino acids, proteins, urea, uric acid, etc.;

$NO_2$— represents a Nitrite ion;

$NO_3$— represents a Nitrate ion; and $N_2$ represents Nitrogen Gas.

Refractory Nitrogen cannot be decomposed biologically.

Alkalinity is defined as the ability to resist a drop in pH. For every part ammonia ($NH_3$) converted to nitrate ($NO_3$—), 7.1 parts of alkalinity are depleted, and for every part nitrate ($NO_3$—) removed, 3.6 parts of alkalinity are recovered.

An anoxic zone is a basin, or portion that is mixed, but not aerated. The dissolved oxygen levels must be less than 1.0 mg/L, and avoid as low as 0.0 mg/L. In an anoxic zone, denitrifying bacteria derive oxygen from the nitrate ($NO_3$—) compounds.

Nitrification and denitrification are two terms that are commonly misunderstood. Both are individually distinct processes. Nitrification is the conversion of ammonia ($NH_3$) to nitrate ($NO_3$—). This is a two-step process involving oxygen and two types of bacteria, Nitrosomonas and Nitrobacter, known collectively as nitrifiers, represented as follows:

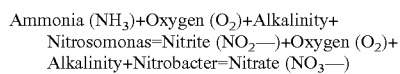

Nitrite ($NO_2$—) is unstable and is easily converted into nitrate. The total conversion of ammonia ($NH_3$) to nitrate ($NO_3$—) requires 4.6 parts oxygen and 7.1 parts alkalinity to convert 1 part ammonia ($NH_3$).

Denitrification is the conversion of nitrate ($NO_3$—) to nitrogen gas ($N_2$). Heterotrophic bacteria use nitrate ($NO_3$—) as an oxygen source under anoxic conditions to break down organic substances as follows:

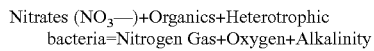

In practice, only certain forms of nitrogen are monitored in wastewater treatment facilities with specialized testing equipment. Testing for TKN involves a test that many wastewater treatment facility laboratories are not equipped to perform. If testing for TKN is not possible, other methods are used for monitoring the nitrogen cycle.

Typically, ammonia ($NH_3$) values are approximately 60% of the TKN values, and the organic nitrogen generally is removed to the settled sludge. Also, total Kjeldahl nitrogen (TKN) generally equals 15-20% of the Biochemical Oxygen Demand (BOD) of the raw sewage. Testing the following aid in monitoring and controlling the nitrogen cycle: pH, alkalinity, ammonia ($NH_3$), nitrite ($NO_2$—) and nitrate ($NO_3$—). All major laboratory supply companies sell field test kits that are inexpensive, easy to use, and provide quick relatively accurate results.

Having a good understanding of the form and extent of nitrogen in a wastewater treatment facility requires a good sampling program that gives a complete profile of the system. The first sampling point should test the raw influent, or primary effluent if the system has a primary clarifier. Typically, what enters the system is high in alkalinity and ammonia ($NH_3$) with little to no nitrite ($NO_2$—) or nitrate ($NO_3$—). A quick way to determine if additional alkalinity may be needed is to multiply the amount of ammonia ($NH_3$) by 7.1 mg/L. If this number exceeds the influent alkalinity concentration, sodium hydroxide or lime may be needed to be added to the aeration tank.

pH is significant because, when ammonia ($NH_3$) begins converting to nitrate ($NO_3$—) in the aeration tank, many hydrogen ions are released. When alkalinity drops below 50 mg/L, pH can drop dramatically. The pH of the aeration tank should never drop below 6.5, otherwise desired biological activity will be inhibited and toxic ammonia ($NH_3$) can bleed through the system to the environment.

Ammonia ($NH_3$) should have extremely low concentrations. Nitrite ($NO_2$—) should be very low to non-detectable, with the majority of the nitrogen in the nitrate ($NO_3$—) form. If a suitable environment is maintained in the aeration tank, most of the ammonia ($NH_3$) will be converted to nitrate ($NO_3$—) by the time it leaves the tank.

All tested nitrite ($NO_2$—) levels should be very low. High levels of nitrite ($NO_2$—) in the system indicate an existing or anticipate problem with the nitrification cycle.

Nitrosomonas bacteria are hardier than Nitrobacter bacteria. If the Nitrobacter bacteria die off, the Nitrosomonas bacteria will continue working on the ammonia ($NH_3$) and the cycle will overload with high levels of nitrite ($NO_2$_). An effluent with high nitrite ($NO_2$_) concentrations is difficult to disinfect because of the tremendous chlorine demand it poses.

Other problems also can occur during nitrification. A decrease in the aeration tank pH due to insufficient alkalinity causes ammonia ($NH_3$) to bleed through the system, which causes decreased microbiological activity. Other factors that prevent complete nitrification include: a lack of dissolved oxygen; high mixed liquor suspended solids; low mean cell retention time; and cold temperatures.

All of these factors can inhibit the nitrification cycle. High ammonia ($NH_3$) discharges can affect toxicity testing. High nitrite ($NO_2$—) levels will cause a tremendous chlorine demand making disinfection difficult, jeopardizing fecal coliform limits. Leaving sludge that is high in nitrate ($NO_3$—) too long in a secondary clarifier can cause it to rise to the surface when the nitrogen gas is released. This is messy and jeopardizes TSS limits.

Although problematic, nitrifying wastewater is important for many reasons. Aside from permit limits, ammonia ($NH_3$)

is toxic to fish and other aquatic life. Ammonia (NH$_3$) discharges also place a very high oxygen demand on the receiving streams. Nitrification also aids in producing a highly stabilized effluent.

When all of the ammonia (NH$_3$) is converted to nitrate (NO$_3$—), it is removed from the system or denitrified. Denitrification requires an anoxic zone within the wastewater treatment facility. Regardless of where and how it is done, the principles of operating an anoxic zone are always the same. First, dissolved oxygen levels must be as low as possible without reaching 0.0 mg/L. A safe target point to avoid septicity while starting an anoxic zone is 0.5 mg/L. A good operating point is 0.2 mg/L.

Second, a carbon source must exist for denitrification to occur. A "carbon source" supplies life energy to the bacteria. A carbon source compound may include additional elements to carbon, such as hydrogen and oxygen. The bacteria also must have oxygen to be able to utilize the carbon. They obtain oxygen from the easiest sources in the order of: (1) free and dissolved oxygen; (2) nitrate (NO$_3$—); and then (3) sulfate (SO$_4$—). If the environment has no free or dissolved oxygen, the bacteria obtain oxygen by breaking down nitrate (NO$_3$13 ) returned to the anoxic zone in the form of activated sludge. As the bacteria use the nitrate (NO$_3$—) as an oxygen source to break down the carbon, their food source, nitrogen gas is released to the atmosphere as follows:

bacteria+Carbon Source+Nitrate (NO$_3$—)=Nitrogen Gas (N$_2$)+Carbon Dioxide (CO$_2$)+3.6 parts Alkalinity+Water (H$_2$O)

When all of the nitrate (NO$_3$—) is used up, the bacteria look for oxygen from available sulfate (SO$_4$—). As the sulfates are used up, the free sulfides will combine with hydrogen to form hydrogen sulfide, which has a characteristic "rotten egg" odor. Thus, treatment plant operators are can always tell when all of the nitrate (NO$_3$—) is being converted into nitrogen gas (N$_2$).

Raw influent can be used as a carbon source. However, most treatment plants supplement the carbon source, for example, by injecting methanol, ethanol or other like carbon sources. Roughly 2.0-2.5 parts methanol is required for every part nitrate (NO$_3$—) that is denitrified.

The mixed liquor suspended solids concentration must be kept in balance with the carbon source supply. In other words, the carbon source-to-microorganisms ratio should be in the proper range, on the lower end, for the type of process operating. The pH of the anoxic zone should be close to neutral (7.0) and never drop below 6.5.

Optimal denitrification occurs when as much as possible of the nitrate (NO$_3$—) is converted into nitrogen gas (N$_2$). Achieving this requires a sufficient amount of a carbon source so that the indigenous heterotrophic bacteria will consume all of the dissolved oxygen as well as the oxygen from the nitrate (NO$_3$—), thereby converting as much as possible of the nitrate (NO$_3$—) into nitrogen gas (N$_2$).

Many carbon sources for denitrification have been studied and utilized in wastewater treatment systems. The most popular include the simple alcohols methanol [15] and ethanol [3]. Acetate in the form of either acetic acid [1] or some acetate salt, e.g. sodium acetate [7], has also been used. "Acetate" refers to either the ion, as in sodium acetate, or the substituent group, as in ethyl acetate [6]. The studies frequently indicate acetate [7] as the most effective of these listed, and the many other compounds subjected to these studies.

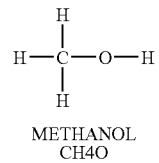

METHANOL
CH4O
[15]

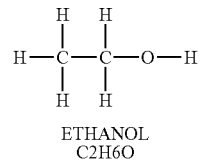

ETHANOL
C2H6O
[3]

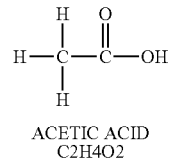

ACETIC ACID
C2H4O2
[1]

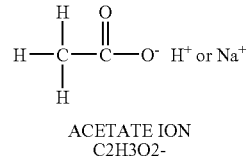

ACETATE ION
C2H3O2-
[7]

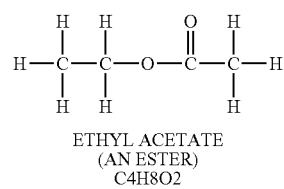

ETHYL ACETATE
(AN ESTER)
C4H8O2
[6]

However, these compounds leave much to be desired for use as denitrification carbon sources for wastewater treatment units, especially on-site wastewater treatment units. Acetic acid is a solid and corrosive in the pure state. When diluted to safer levels, it becomes very bulky. Acetate salts also are hazardous solids, and face the same fate on adequate dilution. Since acetate salts of sodium or potassium are solids, they must be dissolved for pumping by metering devices. These solutions are bulky, and leave solid residue on drying that can foul the equipment. The residual from utilization by the bacteria is an increase in alkalinity that is impractical to control in an unattended system.

Among the other compounds used for larger plants are simple alcohols, like ethanol [3] and methanol [15], depicted above, and polyalcohols like glycerol [2]. These alcohols also have their own limitations with respect to on-site use.

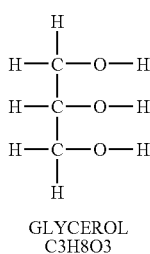

GLYCEROL
C3H8O3
[2]

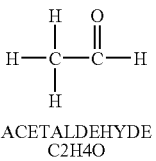

ACETALDEHYDE
C2H4O
[14]

Fatty acids, monoglycerides, and diglycerides derived from the saponification of fats also can be used as carbon sources. Short-chain fatty acids are water soluble, while longer-chain fatty acids reduce solubility so that they become surfactants, with soap being the classic example. Their esters are insoluble.

Fats and oils are esters of glycerin and 3 long chain fatty acids, and are also known as triglycerides [8]. Fatty acids that have carbon-to-carbon double bonds are referred to as "unsaturated fatty acids" [5].

What is needed is a carbon source compound that can deliver the effectiveness of acetate with none of the above-mentioned issues, and has only residuals that can be assimilated by the denitrifying bacteria.

One such compound class could be the acetate esters of glycerol. Other polyalcohols, such as ethylene glycol [16], propylene glycol [17] and butylene glycol [19]-[22] also might serve as carriers of acetate in the form of esters, which are combinations of alcohols and organic acids. One example might be 1,2-propylene glycol diacetate [18]. Ethanol and acetic acid combine to form ethyl acetate [6], depicted above.

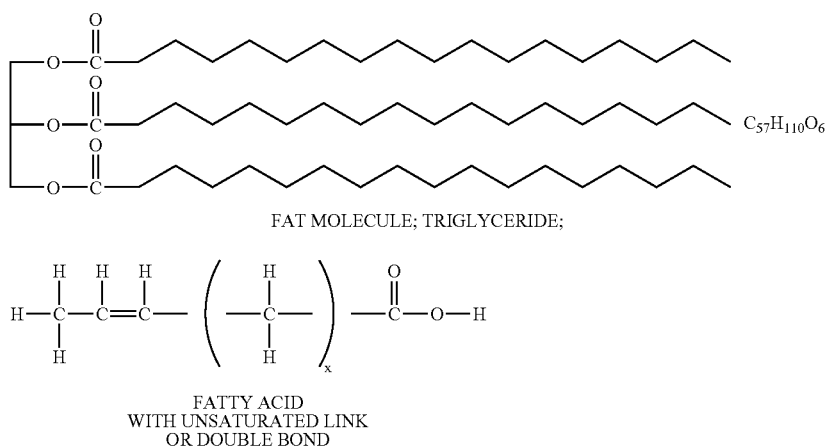

FAT MOLECULE; TRIGLYCERIDE; $C_{57}H_{110}O_6$ [8]

FATTY ACID
WITH UNSATURATED LINK
OR DOUBLE BOND
[5]

These traditional supplementary carbon sources, methanol and ethanol, have undesirable characteristics, especially for on-site use, including acute toxicity; volatile; flammable; and form explosive vapor mixtures with air in confined spaces. Ethanol, while grain derived in its natural form is highly regulated and expensive. Cheaper, unregulated denatured ethanol, in excess amounts, inhibits decomposition. It also, when decomposed, yields byproducts including benzene, ethylene, toluene, and xylene, which should not be released into the environment. Since an excess of carbon source is needed to ensure that a sufficient amount of heterotrophic bacteria will locate and convert as much as possible of the nitrate ($NO_3{-}$) into nitrogen gas ($N_2$), using denatured ethanol causes less and less conversion and could build up in the treatment tank and stifles decomposition. Although ethanol is a good carbon source, it must be converted to acetaldehyde [14], and then acetate before the bacteria can utilize it.

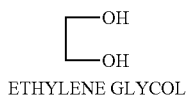

ETHYLENE GLYCOL
[16]

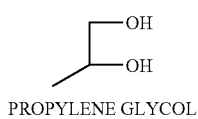

PROPYLENE GLYCOL
[17]

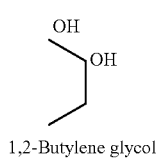

1,2-Butylene glycol
[19]

-continued

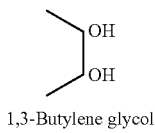

1,3-Butylene glycol    [20]

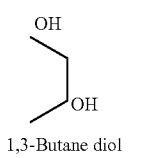

1,3-Butane diol    [21]

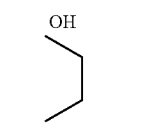

1,4-Butane diol    [22]

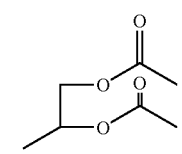

PROPYLENE GLYCOL DIACETATE    [18]

Many wastewater treatment facilities perform single-tank denitrification by creating and utilizing anoxic zones. Some examples are:

(1) Constructing a dedicated anoxic zone at the head of the aeration tank by installing a baffle and mechanical mixers;

(2) Utilizing the first ¼ to ⅓ of the aeration basin as an anoxic zone by throttling the aeration system diffusers valves to allow mixing without transferring dissolved oxygen. A dissolved oxygen probe in the aeration tank tied into a variable frequency drive that sends a signal to the blowers, providing a continuous dissolved oxygen level as determined by the set points; and (3) Utilizing timers to cycle the aeration system on and off which allows the whole aeration basin to be used intermittently as an anoxic zone.

These approaches do not completely denitrify the wastewater so treated.

What are needed, and not taught or suggested in the art, are an apparatus for and method of denitrifying a solution that employs an inexpensive, non-toxic, unregulated carbon source for heterotrophic bacteria to reduce all nitrate ($NO_3-$) in solution.

SUMMARY OF THE INVENTION

The invention overcomes the disadvantages noted above by providing apparatus for and method of denitrifying a solution that employs an inexpensive, non-toxic, unregulated carbon source that promotes activity of heterotrophic bacteria that reduce all nitrate ($NO_3-$) in solution.

To that end, an embodiment of an apparatus for denitrifying solution configured according to principles of the invention includes a sensor configured to measure a parameter of the solution and define a measurement and a controller configured to be operably connectable with the sensor and to compare the measurement with a predetermined value. When a predetermined relationship between the measurement and the predetermined value exists, the controller causes an amount of a carbon source to be introduced into the solution for a duration and at a frequency. One or more of the amount, duration and frequency are determined so that indigenous heterotrophic bacteria deplete dissolved oxygen in the solution and obtain oxygen from nitrate in the solution.

Another embodiment of an apparatus for denitrifying solution configured according to principles of the invention includes a denitrification tank configured to receive a portion of the solution for a period of time wherein controlling an amount, duration and frequency of introduction of a carbon source into the solution promotes indigenous heterotrophic bacteria depletion of dissolved oxygen in the solution and decomposition of oxygen from nitrate in the solution to obtain its combined oxygen.

An embodiment of a compound for denitrifying a solution configured according to principles of the invention includes a backbone selected from a polyol, a simple sugar and combinations thereof and a substituent selected from: a low molecular weight organic acid radical attached with ester linkages or an alkyl group from a simple alcohol attached with ether linkages.

An embodiment of a method of denitrifying a solution configured according to principles of the invention includes introducing into the solution an amount of a carbon source within a duration and at a frequency so that indigenous heterotrophic bacteria deplete dissolved oxygen in the solution and obtain oxygen from nitrate in the solution.

Another embodiment of a method of denitrifying a solution configured according to principles of the invention includes reducing a level of dissolved oxygen in the solution sufficiently so that indigenous heterotrophic bacteria deplete the dissolved oxygen in the solution and obtain oxygen from nitrate in the solution.

The invention provides improved elements and arrangements thereof, for the purposes described, which are inexpensive, dependable and effective in accomplishing intended purposes of the invention.

Other features and advantages of the invention will become apparent from the following description of the preferred embodiments, which refers to the accompanying drawings.

BRIEF DESCRIPTION OF THE DRAWINGS

The invention is described in detail below with reference to the following figures, throughout which similar reference characters denote corresponding features consistently, wherein:

FIG. 4 is a schematic representation of an embodiment of a method configured according to principles of the invention.

DETAILED DESCRIPTION OF THE PREFERRED EMBODIMENTS

The invention is an apparatus for and method of denitrifying a solution that accepts nitrified solution and introduces a carbon source into the solution that promotes heterotrophic bacterial reduction of nitrate ($NO_3-$).

Figure 1:
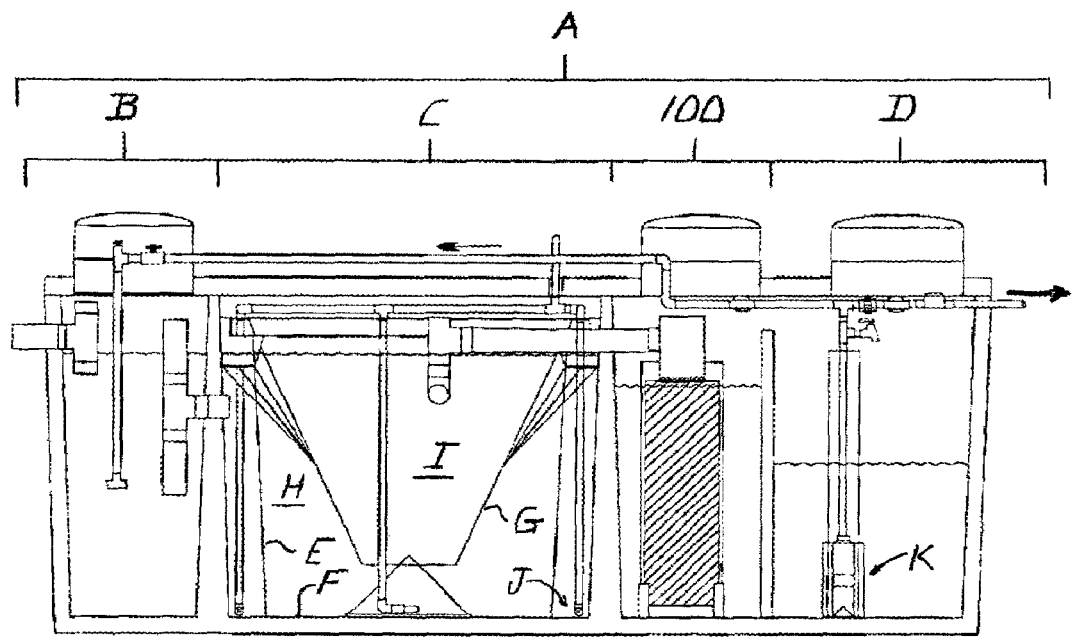
FIG. 1 is a vertical, cross-sectional detail view of an apparatus configured according to principles of the invention incorporated in a wastewater treatment system.
Figure 2:
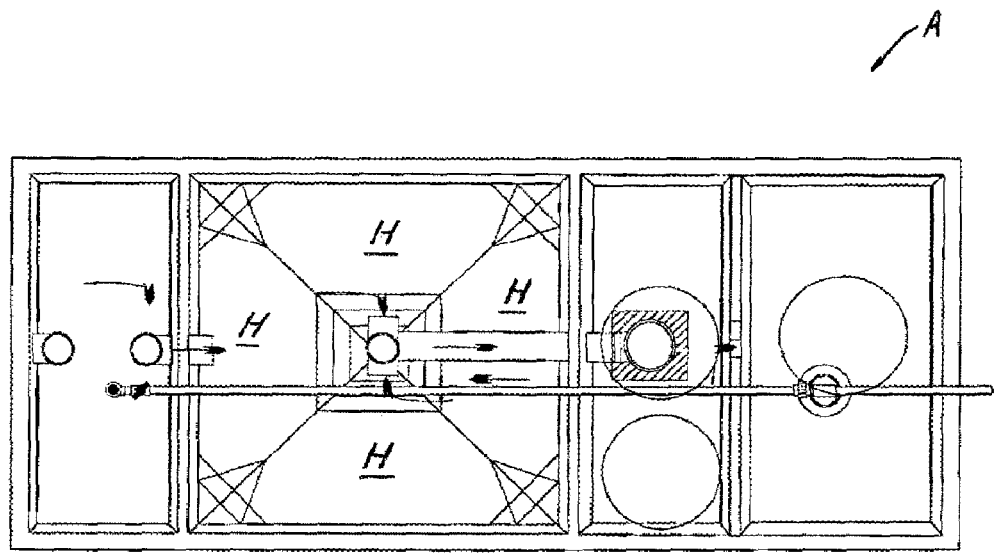
FIG. 2 is a plan view of the embodiment of FIG. 1.

Referring to FIGS. 1 and 2, a denitrification apparatus 100 is shown incorporated in a conventional wastewater treatment plant A. Wastewater treatment plant A includes a pre-treatment tank B, a treatment tank C and a holding tank D. Untreated solution flows into the pre-treatment tank B, into and through the treatment tank C, into and through denitrification apparatus 100, into and through the holding tank D, then is voided into the environment.

Pre-treatment tank B receives raw, untreated wastewater and initiates the aerobic phase of treatment during which aerobic bacteria break down the wastewater. Pre-treatment tank B also retains any non-biodegradables inadvertently introduced into the system, such as rags and plastic, which settle out prior to introduction of the fluid into the treatment tank.

Treatment tank C is where the bulk of the aerobic wastewater decomposition occurs. Treatment tank C includes walls E and a floor F. A hopper G mounted in tank C cooperates with walls E and floor F to define aerator zones H and an interior clarifier chamber I. Diffusers J in treatment tank C promote flow in aerator zones H, which enhances the oxygen content of the wastewater in tank C and aerobic breakdown of solid matter therein. In aerator zones H, aeration thoroughly mixes the organic materials of the wastewater with the bacterial population so that the bacteria attack and reduce the organic materials.

Aerated and reduced wastewater from aeration zones H passes into clarifier chamber I. The throat-like lower aperture of hopper G minimizes fluid flow within clarifier chamber I and encourages the settling out of particulate matter in clarifier chamber I back into aerator zones H for additional breakdown.

Before passing wastewater from clarifier chamber I into holding tank D, the invention provides for denitrification of the wastewater from clarifier chamber I in denitrification apparatus 100, described in greater detail below.

Holding tank D receives denitrified wastewater from denitrification apparatus 100 where it remains for a period of time. Any remaining particulate matter in the wastewater settles out prior to being pumped by a pump K out of wastewater treatment system A into the environment.

Figure 3:
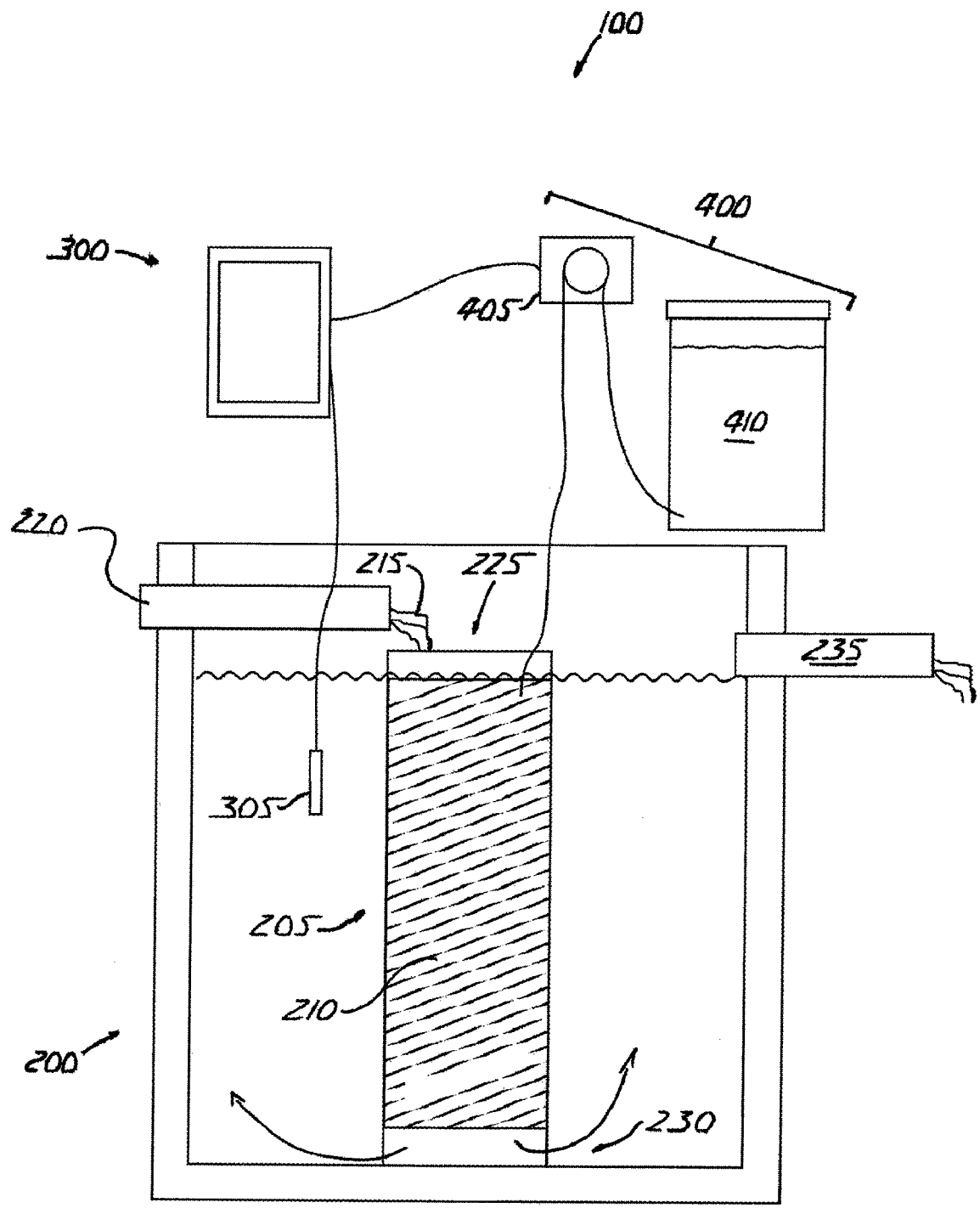
FIG. 3 is a vertical, cross-sectional detail view of an apparatus configured according to principles of the invention.

Referring to FIG. 3, denitrification system 100 preferably includes a denitrification tank 200, a controller 300 and a doser 400. Denitrification tank 200 receives nitrified solution. Controller 300 monitors parameters of the solution in denitrification tank 200 and regulates doser 400, which introduces a carbon source into denitrification tank 200 and cause conditions that are appropriate for cellular respiration and optimal for denitrification, as described in greater detail below.

Denitrification tank 200 includes an anoxic media cell 205 in which media 210 are suspended. Nitrified solution 215, preferably from pre-treatment tank C, as shown in FIG. 1, from inlet 220 enters the top 225 of anoxic media cell 205 and passes through media 210. From media 210, the solution passes out of the bottom 230 of anoxic media cell 205. Media-treated solution is displaced by inflow and eventually passes from denitrification tank 200 through outlet 235.

Denitrification tank 200, while distinct from or selectably isolated from the rest of a wastewater treatment system, nevertheless may be structurally integral therewith, attached thereto or disposed therein.

Media 210 encourage growth of denitrifying surface bacteria.

Controller 300 monitors one or more probes 305 in denitrification tank 200. Probes 305 measure one or more of the following parameters: pH; dissolved oxygen; influent flow; effluent flow; conductivity; alkalinity; nitrates; and oxidation reduction potential. Based on one or more parameter values measured for one or more of the parameters, controller 300 causes doser 400 to dispense a carbon source in denitrification tank 200 in an appropriate amount, for an appropriate duration and at appropriate frequencies so that denitrification tank 200 exhibits anoxic conditions with sufficient carbon, or otherwise promotes growth of denitrifying bacteria and optimal denitrification capabilities.

When controller 300 determines that an aerobic condition exists, typically at least 1 g/mL of $O_2$ controller 300 instructs doser 400 to deliver an amount of a carbon source to denitrification tank 200. The carbon source supplies life energy to the bacteria. The bacteria then obtain oxygen from the easiest sources in the order of: (1) free and dissolved oxygen; (2) nitrate ($NO_3$—); and then (3) sulfate ($SO_4$—). This converts the aerobic conditions in denitrification tank 200 to anoxic. Controller 300 also can ensure that denitrification tank 200 remains in an anoxic condition for a duration required for denitrification.

The denitrifying surface bacteria population increases more when exposed to cyclical aerobic-anaerobic conditions, rather than steady-state aerobic or anaerobic conditions. This is why it is preferable to cultivate the denitrifying surface bacteria population in a distinct denitrification tank 200 that may be selectably placed, rather than always in communication with the wastewater system, and in particular, the aeration tank or aerobic portion thereof. Carefully maintaining anoxic conditions in denitrification tank 200 ensures survival of the bacteria.

If the denitrification tank is aerobic all of the time, aerobes will exist there, and if it is anaerobic all of the time, anaerobes will exist there. Denitrifiers use oxygen for respiration and carbon for food. If the denitrifiers are already working under anoxic conditions, have food, but lack oxygen, they will use the closest thing available for respiration, which is Nitrate, which the denitrifiers convert into water and $N_2$ and $CO_2$.

There also will exist an accumulation of biomass of living and dead bacteria. This biomass most likely uses some of the nitrate for amino acid and protein formation. Provisions must be made to periodically remove and dispose of this biomass. One method might be to return it to the aeration tank stage.

Utilizing a combination of the alcohols and acetate as a carbon source eliminates all of the problems with carbon sources noted above. A combination that is particularly useful is glycerin and acetate in the form of a mixture of glycerol acetates, known in the bulk product industry as diacetin. This name derives from that of the most abundant component, 1,3-diacetin [9], but the mixture often contains significant amounts of 1,2-diacetin [10], triacetin [11], glycerol-1-acetate [12], and glycerol-2-acetate [13].

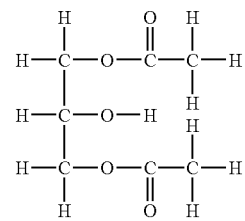

1,3-DIACETIN
OR
1,3-GLYCEROL DIACETATE
C7H12O5

-continued

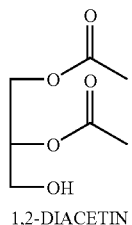

1,2-DIACETIN

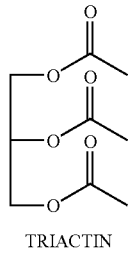

TRIACTIN

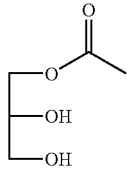

GLYCEROL-1-ACETATE

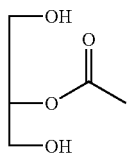

GLYCEROL-2-ACETATE

The preferred carbon source is diacetin or glycerol diacetate. Diacetin is preferred because it is rich in acetate substituents that have been shown to be exceptionally effective in the denitrification process. In addition, it is a non-hazardous material, non-toxic and non-flammable, and does not evaporate or form solids. Diacetin is rich in available carbon. Also, unlike surplus amounts of ethanol and methanol, surplus amounts of diacetin do not inhibit the denitrification process.

Acetate is superior to ethanol because ethanol must be converted biologically to acetaldehyde [14], and then to acetate before the denitrifying bacteria can utilize it. Providing a substance that is ready for use to the denitrifying bacteria speeds up the denitrification process by eliminating this conversion step.

Diacetin is an excellent carbon source for on-site anoxic denitrification of solution because it provides a delivery system for the acetate moiety that meets a number of requirements. What makes glycerol particularly suited for denitrification is that it acts as a carrier for a readily available form of carbon. In layman's terms, glycerol is the carrier, and acetate is the container of the carbon food source for the denitrifying bacteria.

Diacetin is acetate attached to glycerin as a backbone. When the acetate is consumed, the bacteria also utilize the remaining glycerin, leaving only water and carbon dioxide as residuals. The bacteria tolerate inadvertent excesses of diacetin much better than excesses of other foods such as ethanol or especially methanol. The intermediate acetaldehyde and formaldehyde produced by these compounds are known preservatives (antibacterial).

Diacetin is readily taken up by the facultative bacteria and held for use until an oxygen source of dissolved oxygen, nitrate, or nitrite becomes available, keeping the food away from the anaerobes. Facultative bacteria are those that can grow with or without oxygen.

Diacetin is a liquid, neutral, non-hazardous, very compact in its carbon content. It is used as a food additive and in the preparation of tablets from drugs in the powder form. Commercially, it is prepared from the reaction of acetic anhydride and glycerin. Environmental release is easily handled in small amounts.

While glycerol diacetate seems to be the most useful compound structure, other carbon sources also could be use that derive from fatty acid esters of polyhydroxyl compounds so long as they fulfil the following conditions:
1. Liquid at all weather temperatures;
2. Readily miscible with water in the proportions of use;
3. Non volatile, nonflammable; and
4. Non toxic.

These requirements eliminate practically all of the class except the glyceryl acetates.

Another class has ether groups as handles that are more likely to be toxic because they are rarely encountered in nature.

Polyhydroxyls have more than one hydroxy (—OH) group on the compound. Ethylene glycol is the simplest member, with two groups (HOCH2CH2OH). Glycerin has three. Simple sugars, like glucose, fructose, etc., have six.

Diacetin also is know as: Diacetylglycerol; Glycerin Diacetate; Glycerine Diacetate; Glyceryl Diacetate; Glycerol 1,3-diacetate; 2-(Acetyloxy)-1-(hydroxymethyl)ethyl acetate.

Referring again to FIG. 3, doser 400 may include a peristaltic pump 405 or other metering mechanism for delivering a predetermined volume of the carbon source from a container 410 into media cell 205 or influent stream 215. The carbon source provides an energy source for the denitrifying bacteria, which consumes the available dissolved oxygen from the solution in denitrification tank 200, thereby converting the aerobic conditions denitrification tank to anoxic. The denitrifying bacterial then consume the oxygen in the remaining Nitrate and convert the nitrate into water, $N_2$ and $CO_2$.

Referring to FIG. 4, a method of denitrifying solution 500 configured according to principles of the invention includes: a step 505 of measuring a parameter of the solution and defining a measurement; a step 510 of comparing the measurement with a predetermined value; a step 515 introducing into the solution an amount of a carbon source, as described above, wherein the frequency and duration of the introducing and/or the amount is determined according to a relationship between the measurement and the predetermined value.

Step 505 may involve measuring one or more of: pH; dissolved oxygen; influent flow; effluent flow; conductivity; alkalinity; nitrates; and oxidation reduction potential.

Step 510 may involve establishing data in a memory of the controller against which the controller may compare the measurement of step 505. Simple or elaborate conditions or logic statements may be defined for determining when an appropriate aerobic condition exists, following which anoxic conditions may be appropriate.

Step 515 may involve instructing a doser to deliver an amount of a carbon source to the denitrification tank. Step 515 is timed and cycled so as to cause conditions in the solution to be anoxic, which promotes the growth of indigenous denitrifying bacteria. The amount of the carbon source also may be tailored to create conditions desired for optimal denitrification. The amount should be sufficient and within a short enough duration to remove the dissolved oxygen from the solution sufficiently so that the indigenous bacteria are forced to draw oxygen from the remaining nitrate.

The invention is not limited to the particular embodiments described and depicted herein, rather only to the following claims.

We claim:

1. Apparatus for denitrifying a solution comprising a denitrification tank configured to receive a portion of the solution for a period of time wherein controlling an amount, duration and frequency of introduction of diacetin into the solution promotes indigenous heterotrophic bacteria depleting dissolved oxygen in the solution and obtaining oxygen from nitrate in the solution.

2. Apparatus of claim 1, further comprising media configured to be disposed and promote growth of indigenous heterotrophic bacteria in the solution.

3. Apparatus of claim 1, further comprising:
a sensor configured to measure a parameter of the solution and define a measurement; and
a controller configured to be operatively connectable with said sensor and to compare the measurement with a predetermined value and, when a predetermined relationship between the measurement and the predetermined value exists, control the amount, duration and frequency.

4. Apparatus of claim 3, wherein said parameter relates to a level of dissolved oxygen; influent flow; effluent flow; conductivity; alkalinity; nitrates; and combinations thereof.

5. Apparatus of claim 3, further comprising a doser configured to be operably connectable with said controller and dispense the amount.

6. Apparatus of claim 1, further comprising an aeration tank or pretreatment device configured to provide the solution to said denitrification tank, and/or a pump or holding tank configured to receive solution from said denitrification tank.

7. Apparatus for denitrifying a solution comprising a controller that releases an amount of diacetin into the solution for a duration at a frequency;
wherein one or more of the amount, duration and frequency are determined so that indigenous heterotrophic bacteria deplete dissolved oxygen in the solution and obtain oxygen from nitrate in the solution.

8. Apparatus of claim 7, further comprising a doser configured to be operably connectable with said controller and dispense the amount.

9. Apparatus of claim 7, further comprising:
a denitrification tank; and
an aeration tank or pretreatment device configured to provide the solution to said denitrification tank, and/or a pump or holding tank configured to receive solution from said denitrification tank.

10. Apparatus of claim 7, further comprising media configured to be disposed and promote growth of indigenous heterotrophic bacteria in the solution.

11. Apparatus of claim 7, further comprising:
a sensor configured to measure a parameter of the solution and define a measurement; and
a controller configured to be operatively connectable with said sensor and to compare the measurement with a predetermined value and, when a predetermined relationship between the measurement and the predetermined value exists, control the amount, duration and frequency.

12. Apparatus of claim 11, wherein said parameter relates to a level of dissolved oxygen; influent flow; effluent flow; conductivity; alkalinity; nitrates; and combinations thereof.

* * * * *

UNITED STATES PATENT AND TRADEMARK OFFICE
CERTIFICATE OF CORRECTION

PATENT NO. : 7,544,292 B2
APPLICATION NO. : 11/721995
DATED : June 9, 2009
INVENTOR(S) : Cormier et al.

It is certified that error appears in the above-identified patent and that said Letters Patent is hereby corrected as shown below:

Col. 14 claim 11, line 25, after "configured" insert --to be operatively connectable with said controller and--;
        line 26, delete second occurrence of "and";
        line 27, delete "a" and insert therefor --wherein said--; and
        line 27-28, delete "configured to be operatively connectable with said sensor and to compare" and insert therefor --compares--.

Signed and Sealed this

Twenty-eighth Day of July, 2009

JOHN DOLL
*Acting Director of the United States Patent and Trademark Office*